W. I. SHERWOOD.
SPEED METER.
APPLICATION FILED FEB. 2, 1907.
946,687.
Patented Jan. 18, 1910.
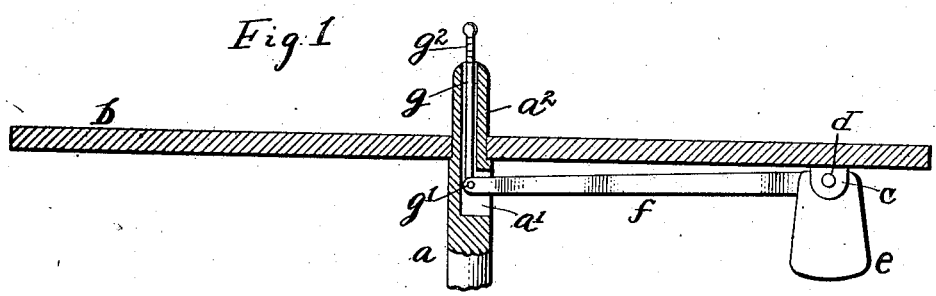
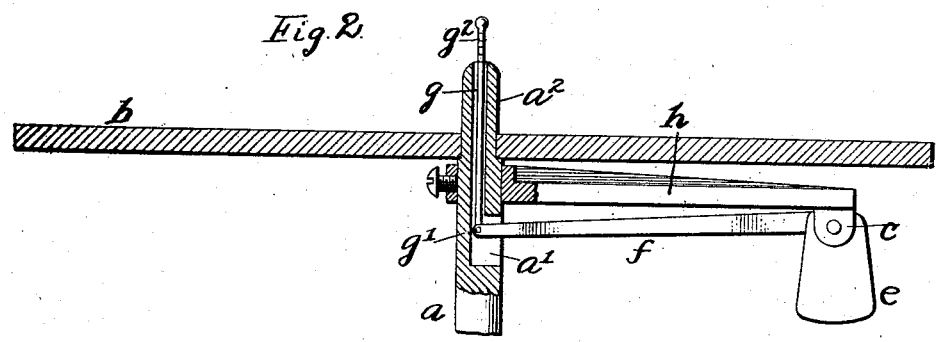
Witnesses:
Inventor:
William I. Sherwood
By Geo. L. Wheelock
Atty

UNITED STATES PATENT OFFICE.

WILLIAM I. SHERWOOD, OF NEW YORK, N. Y., ASSIGNOR TO PHONOGRAPHIC MUSIC CO., OF BROOKLYN, NEW YORK, A CORPORATION OF NEW YORK.

SPEED-METER.

946,687.  Specification of Letters Patent.  Patented Jan. 18, 1910.

Original application filed December 12, 1906, Serial No. 347,402. Divided and this application filed February 2, 1907. Serial No. 355,449.

*To all whom it may concern:*

Be it known that I, WILLIAM I. SHERWOOD, a citizen of the United States, residing at New York, borough of Manhattan, and State of New York, have invented certain new and useful Improvements in Speed-Meters, of which the following is a specification.

This invention relates to a centrifugally operated speed meter, the object of which is to provide simple, reliable, practical and economical means for indicating speed, such as the speed of a shaft governed to run at a predetermined rate. It is more especially adapted to determine the speed at which a sound reproducer of the graphophone, phonograph or gramophone type is running.

One of the special objects of the present invention is to provide a graduated index-member which moves longitudinally in relation to a rotary shaft, so that according as said index-member is projected or depressed, a person may readily and quickly perceive the speed at which the shaft is running without constantly changing the focus of the eye.

The present application is a division and continuation of my earlier application, Serial No. 347,402, filed December 12, 1906.

In the accompanying drawings which illustrate desirable forms of the invention, Figure 1 shows the improvement in connection with a vertical record shaft and a record-receiving table of a phonograph. Fig. 2 shows the same parts, excepting that instead of supporting the meter mechanism from the rotating table, it is supported from a separate bracket.

The invention is shown as incorporated with and forming a part of the appropriate mechanism of a phonograph or sound reproducer. The rotary vertical shaft $a$ has applied thereto the usual disk or record supporting table $b$. This table also supports the mechanism of the speed meter. The table $b$ is preferably provided with a lug or ear $c$, to which is pivoted at $d$ a suitable weight $e$, from which extends an arm or beam $f$. The free end of this beam $f$ extends into the lower end of a longitudinal hole $a'$ in the upper end $a^2$ of the shaft $a$, which forms a guide portion. The said free end of the beam $f$ has sufficient play so as to impart ample longitudinal movement to an index-member $g$, which is pivoted at $g'$ to said beam, and which slides in the hole $a'$. This index-member is provided with a series of graduations $g^2$ which read from above downwardly, and may be graded for use with a sound reproducer. These graduations are adapted to be set oppositely to the upper extremity of the vertical shaft $a$, which forms an indicator, so that the graduations may be properly read off. It will be observed that the rotary table $b$ carries the speed meter around with it, and that the weight $e$ is acted upon centrifugally so as to slide the index-member $g$ in one direction or the other along or relatively to the upper end of the shaft.

In the modification shown in Fig. 2 the same parts of the speed meter as are shown in Fig. 1 are shown, they being only of slightly different proportions. In said Fig. 2 a bracket $h$ on the vertical shaft takes the place of the rotary table, the weight being pivoted to the bracket as shown.

It is obvious that the different forms of speed meters herein shown and described are susceptible of various changes in details of construction and methods of application, and that such changes may be made by skilled mechanics without departing from the spirit and scope of the invention, and that the invention may be used for testing the speed of any rotary vertical shaft.

What I claim as new and of my invention is:

1. In a speed meter, the combination of a vertical shaft, the speed of which is to be tested, a support extending laterally from said shaft, a graduated index-member having its graduated portion guided in line with the axis of said shaft, and a centrifugally operated beam pivotally supported from said support at a point remote from the shaft, and extending toward and connected with said index-member.

2. In a speed meter, the combination of a vertical shaft, the speed of which is to be tested, said shaft having an axial hole, a support extending laterally from said shaft, a graduated index-member guided in said hole and having its graduated portion alined with said hole, and a centrifugally operated beam pivotally supported from said support at a point remote from the shaft, and extending toward and connected with said index-member.

3. In a speed meter, the combination, with a rotary table or disk provided with a central hole, of indicating means on one side of the disk or table, comprising an indicator member and a graduated member, and means, on the other side of the table or disk, acting at the bottom of the said hole, upon one of said members to move it relatively to the other member.

In witness whereof, I have hereunto set my hand this 30th day of January, 1907.

WILLIAM I. SHERWOOD.

Witnesses:
 WM. H. VOGEL,
 LOUIS C. HAARSTECK.